(12) United States Patent
Fujita et al.

(10) Patent No.: US 7,343,559 B1
(45) Date of Patent: Mar. 11, 2008

(54) COMPUTER-READABLE RECORDED MEDIUM ON WHICH IMAGE FILE IS RECORDED, DEVICE FOR PRODUCING THE RECORDED MEDIUM, MEDIUM ON WHICH IMAGE FILE CREATING PROGRAM IS RECORDED, DEVICE FOR TRANSMITTING IMAGE FILE, DEVICE FOR PROCESSING IMAGE FILE, AND MEDIUM ON WHICH IMAGE FILE PROCESSING PROGRAM IS RECORDED

(75) Inventors: Takeshi Fujita, Ichikawa (JP); Hitoshi Endoh, Kasukabe (JP); Nariaki Hatta, Tokyo (JP); Yasufumi Fujikawa, Ebina (JP)

(73) Assignees: Visionarts, Inc., Tokyo (JP); Sony Corporation, Tokyo (JP)

( * ) Notice: Subject to any disclaimer, the term of this patent is extended or adjusted under 35 U.S.C. 154(b) by 385 days.

(21) Appl. No.: 09/806,545

(22) PCT Filed: Aug. 3, 2000

(86) PCT No.: PCT/JP00/05228

§ 371 (c)(1),
(2), (4) Date: Jun. 18, 2001

(87) PCT Pub. No.: WO01/09726

PCT Pub. Date: Feb. 8, 2001

(30) Foreign Application Priority Data

| Aug. 3, 1999 | (JP) | ................................. 11-220385 |
| Oct. 21, 1999 | (JP) | ................................. 11-298958 |
| Mar. 21, 2000 | (JP) | ............................. 2000-079182 |

(51) Int. Cl.
| G06F 3/00 | (2006.01) |
| G06F 3/048 | (2006.01) |
| G06F 7/04 | (2006.01) |
| H04L 9/00 | (2006.01) |

(52) U.S. Cl. ...................... 715/733; 715/739; 715/745; 715/781; 713/176; 726/21

(58) Field of Classification Search ................ 345/716, 345/734, 738, 744, 810, 853; 709/223, 224; 382/305, 173; 340/810; 715/733, 745, 739, 715/781, 176; 713/176; 726/21
See application file for complete search history.

(56) References Cited

U.S. PATENT DOCUMENTS 5,720,014 A * 2/1998 Ikeda et al. ................ 358/1.15

(Continued)

OTHER PUBLICATIONS

S. Miki et al., "MPEG-4 no Subete", Sep. 30, 1998, Kabushiki Kaisha Kougyou Chousakai (Tokyo), pp. 206-212.

(Continued)

*Primary Examiner*—Stephen Hong
*Assistant Examiner*—Ting Zhou
(74) *Attorney, Agent, or Firm*—Frommer Lawrence & Haug LLP; William S. Frommer; Thomas F. Presson

(57) ABSTRACT

A computer readable recording medium on which an image file, including data used to display an image, is recorded, wherein at least one of identification information inherent to the image file, pointers of one or a plurality of information, an index of a menu item corresponding to the image file, and an entity of a predetermined program is recorded in said image file.

22 Claims, 13 Drawing Sheets

U.S. PATENT DOCUMENTS

| | | | | |
|---|---|---|---|---|
| 5,809,242 | A | * | 9/1998 | Shaw et al. .................. 709/217 |
| 5,937,392 | A | * | 8/1999 | Alberts ........................ 705/14 |
| 5,970,499 | A | * | 10/1999 | Smith et al. ............. 707/104.1 |
| 6,005,680 | A | * | 12/1999 | Luther et al. ................. 358/2.1 |
| 6,061,057 | A | * | 5/2000 | Knowlton et al. ........... 345/744 |
| 6,141,010 | A | * | 10/2000 | Hoyle ........................ 345/854 |
| 6,373,592 | B1 | * | 4/2002 | Ito .............................. 358/1.2 |
| 6,434,614 | B1 | * | 8/2002 | Blumenau ................... 709/224 |
| 6,452,609 | B1 | * | 9/2002 | Katinsky et al. ............ 345/716 |
| 6,807,285 | B1 | * | 10/2004 | Iwamura ..................... 382/100 |

OTHER PUBLICATIONS

Nikkei Electronics, vol. 683, Feb. 24, 1997 Nikkei BP K.K. (Tokyo) "Digital Shingou Shori, Seishiga wo atsukau Service ga Shidou, Bei Ei 2 Sha ga Senben tsukeru" pp. 108-115.

Nikkei MAC, No. 13, Apr. 15, 1994 Nikkei BP K.K. (Tokyo) "Inside Macintosh, File no Nazo I" pp. 192-197.

* cited by examiner

F I G. 3

CREATION LOG

| Address | Host Name | Access Date And Time | File Name | Identification Information |
|---|---|---|---|---|
| 10.0.0.1 | a.ne.jp | 1999/10/10 10:10 | a.jpg | 28784 |
| 10.0.0.2 | b.co.jp | 1999/10/10 10:11 | b.gif | 1 |
| 10.0.0.3 | c.go.jp | 1999/10/10 10:12 | c.tif | 453 |
| 10.0.0.4 | d.com | 1999/10/10 10:13 | d.bmp | 6899 |

FIG. 5

UPDATE LOG

| Address | Host Name | Access Date And Time | File Name | Identification Information | Creating Server | Client ID |
|---|---|---|---|---|---|---|
| 10.0.0.1 | a.ne.jp | 1999/10/10 10:10 | a.jpg | 367 | 1 | 100 |
| 10.0.0.2 | b.co.jp | 1999/10/10 10:11 | b.gif | 498 | 2 | 101 |
| 10.0.0.3 | c.go.jp | 1999/10/10 10:12 | c.tif | 8790 | 3 | 102 |
| 10.0.0.4 | d.com | 1999/10/10 10:13 | d.bmp | 980 | 4 | 103 |

| Image Name | RPG Legend 2 |
|---|---|
| Password | abc123 |
| Expiration Date | 00/3/21 |
| Thumbnail Image | |
| Category | Game Software |
| Keyword | ... |

(b)

| Pointer Information | Command Name | Action Table | Mouse Operation Assignment | Platform |
|---|---|---|---|---|
| http://www... | Homepage | Not Save/Browse | Double Click | Unlimited |
| http://www... | Demonstration Video | Not Save/Replay Video | Shift+Double Click | Unlimited |
| http://www... | Story | Save/Display Telop | Single Click | Unlimited |
| http://www... | Theme Music | Not Save/Replay Voice | Alt+Double Click | Unlimited |
| http://www... | RPG Legend 1 | Not Save/Add Image | Ctrl+Double Click | Unlimited |

COMPUTER-READABLE RECORDED MEDIUM ON WHICH IMAGE FILE IS RECORDED, DEVICE FOR PRODUCING THE RECORDED MEDIUM, MEDIUM ON WHICH IMAGE FILE CREATING PROGRAM IS RECORDED, DEVICE FOR TRANSMITTING IMAGE FILE, DEVICE FOR PROCESSING IMAGE FILE, AND MEDIUM ON WHICH IMAGE FILE PROCESSING PROGRAM IS RECORDED

TECHNICAL FIELD

The present invention relates to providing information over a network such as Internet. Further, it relates to controlling operations of programs by using image files. Furthermore, it relates to researching user access conditions, for example, easily by using identification information, for example, added to image data.

BACKGROUND ART

World Wide Web (WWW) services provided by many Hyper Text Transfer Protocol (HTTP) servers connected to Internet can be used easily by manipulating HTTP viewer software such as Web browser which is executed on user terminals connected to the Internet.

Introduction of Graphical User Interface (GUI) allows easier Web browser manipulation. Also, The number of HTTP servers connected to Internet is increasing rapidly. Thus, users can obtain more information easily, and WWW services have become widespread rapidly.

An arbitrary image file is used for improving the operations through GUI, and a so-called button which associates a predetermined operation, link, and others to an image corresponding to the image file. As an example of such a button, a so-called banner advertisement is known in which an address such as Uniform Resource Locator (URL) of a supply device for supplying a predetermined advertisement is mapped to an image showing a predetermined product, information and so on.

The banner advertisement is implemented with a button which is defined as a link to a predetermined URL in an HTML (Hyper-Text Markup Language) and an image file which is referred as an image mapped to the button.

A user manipulates a Web browser to instruct (that is, click) a button defined as a banner advertisement so that linked information can be referred easily.

Further, since WWW services are used for business transactions recently and therefore user access conditions, for example, can be researched more easily than general business transactions, they are used for marketing activities also.

As a method for performing such a research, following methods are known:

(1) One method including the steps of storing identification information, Cookie and so on inherent to each user using HTTP viewer software such as so-called Web browser on a user terminal, obtaining the identification information by an HTTP server when the user accesses to the HTTP server, and recording and analyzing a user access to the information provided by the HTTP server;

(2) Another method including the steps of analyzing a packet sent from a user terminal connected to an Internet service provider (simply called ISP below), and recording and analyzing a user access to the information provided by the HTTP server; or (3) Still another method including the steps of recording and analyzing a user access in addition to information provided by an HTTP server such as access analysis software, an access record (log) of the HTTP server and so on through an application independent from the HTTP server.

As a specific example, a method using a Java (trademark) applet in order to record information matching to an access from a user in a file may be cited which is adopted in http://www.snippet.com/home.htm, for example.

However, in the above-described banner advertisement, since an image file and an HTML file including information indicating a real linked location are stored as separate files, it can be done relatively easily to associate a linked location other than a linked location which is originally associated with the image file with the image file by properly defining a description of an HTML file referring the image file. Thus, the image file may be illegally used.

Further, in the above-described access research, there is a room for improvement from the point of view of reality in the method (1) including that Cookie cannot be used in some settings of the HTTP viewer software implemented in the user terminal.

Furthermore, since Cookie is issued, managed and so on for every HTTP server, the access condition research cannot be performed in collaboration with another HTTP server, and since it is necessary to merge access conditions for each HTTP server for researching user access conditions to a plurality of HTTP servers, the research gets more difficult when the number of servers increases.

Still further, in the method (2), when the access condition research is tried to external HTTP servers operated in the outside of the ISP used by the user for connecting to Internet, an increased number of subjects to be researched makes the research highly difficult since the number of HTTP servers connected to the Internet is extremely high.

Further, in the method (3), the research cannot be performed easily because processing such as operating an application for performing the above-described research and analyzing a log is required independent from management of information and logs provided by the HTTP server and therefore complex operations such as identifying HTTP servers to be researched is required.

The present invention was made in view of the above-described problems, and it is an object of the present invention to surely provide information that a supplier of an image file desires to supply to a user of the image file. Further, it is an object of the present invention to provide a plurality of information that a supplier of an image file desires to supply to a user based on one image file.

Furthermore, it is an object of the present invention to allow relatively easier researches of user access conditions, for example.

DISCLOSURE OF INVENTION (1) In order to achieve the above-described objects, the present invention is a computer readable recording medium on which an image file is recorded, wherein, in a data stream of the image file, identification information inherent to the image file, pointers of one or a plurality of information, an index of a menu item corresponding to the image file, and/or an entity of a predetermined program are recorded.

(2) For example, there is provided a computer readable recording medium on which an image file including an area for recording data which influences on a view of an image and an area for recording data which does not influence on the view of the image, wherein, in the area for recording data which does not influence on the view of the image, identification information inherent to the image file, pointers of one or a plurality of information, and/or an entity of a predetermined program may be recorded.

(3) Further, There is provided a computer readable recording medium on which an image file is recorded, wherein, in a data stream of the image file, on an area which is ignored when displaying the image, identification information inherent to the image file, pointers of one or a plurality of information, an index of a menu item corresponding to the image file, and/or an entity of a predetermined program may be recorded.

(4) Furthermore, there is provided a computer readable recording medium on which an image file is recorded, wherein, in a data stream of the image file, a pointer for at least information and handling of information indicated by the pointer may be dealt as one pair so that one pair or a plurality of pairs of them may be recorded.

Here, the "handling of information" is referred to replay of corresponding voice information for voice information, replay of corresponding video information for video information, and display a telop of corresponding text information for text information, for example.

Further, the "pointer information" is referred to a file name, a path name indicating a location of resources on a local computer, Universal Naming Convention (UNC) indicating a location of resources in a network environment, Uniform Resource Locator (URL) indicating a location of resources on Internet or Intranet, or Uniform Resource Identifiers (URIs), for example.

(5) Further, another invention includes a recording unit on which an image file is recorded, an input unit for inputting pointers of one or a plurality of information, an index for a menu items corresponding to the image file, and/or identification information of an entity of a predetermined program, and an information processing unit for recording, in a data stream of the image file, the pointer of the information input from the input unit, the index of the menu item corresponding to the image file, and/or the entity of the program corresponding to the identification information.

(6) It may be achieved by a medium on which an image file creation program is recorded which cause a computer to execute the steps of:

accepting, from the input unit, inputs of a pointer of one or plurality of information, an index for a menu item corresponding to the image file, and/or identification information of an entity of a predetermined program; and recording, in a data stream of an image file stored in a memory unit, the pointers of the information input from the input unit, the index of the menu item corresponding to the image file, and/or the entity of the program corresponding to the identification information.

(7) Further, another invention includes a recording medium according to the above-described (1) to (4) and an information processing unit for reading out the image file from the recording medium in response to a request from a terminal device and returning it to the terminal device.

(8) Further another invention is a medium for recording an image file processing program in order to cause a computer to execute the steps of:

monitoring an access to an information image file managed in a first managing area, when there is an access to the information image file managed in the first managing area, displaying, on a second managing area, an image based on image related information included in the information image file and managing the information image file on the second managing area, monitoring an access to an information image file managed in the second managing area, and, when there is an access to the information image file managed in the second managing area, accessing to and executing a file existing in a predetermined pointer or a corresponding file stored in advance on a local recording medium.

Here, identification information, pointer information, and so on added to image data are referred to "image related information". Further, an image file in which image related information is added to image data is referred to "information image file".

(9) In this case, an access to an information image file managed in the first managing area may be a drag-and-drop operation for a corresponding image.

(10) Alternatively, an access to an information image file managed in the first managing area may be a selection operation for a menu displayed with respect to the corresponding image.

(11) Alternatively, an access to an information image file managed in the first managing area may be a drag-and-drop operation for a menu displayed with respect to a corresponding information image file.

(12) Alternatively, an access to an information image file managed in the first managing area may be a click operation for a corresponding image.

(13) Alternatively, an access to an information image file managed in the first managing area may be a drag-and-drop operation for a corresponding information image file.

(14) Alternatively, it may be achieved by a medium for recording an image file processing program for causing a computer to execute the steps of, when a recording medium in a first managing area can be accessed, searching an information image file from the recording medium, and, when the information image file is searched, reading out the information image file and managing it in a second managing area.

(15) Here, the first managing area may be a window for viewing a Web page of a WWW browser, a window for viewing a body of e-mail software, a window for checking an attached file of e-mail software, a folder window for referring a file stored on a recording medium, or a menu window which is displayed by operating an input unit for an image or an image file.

(16) Another invention is an image file processing device including an information processing unit for storing a menu item corresponding to an image on a memory unit, when a predetermined image is selected from input unit, reading out a menu item corresponding to the selected image from the memory unit in order to display it on a display unit, and, when the displayed menu item is selected through the input unit, performing predetermined processing corresponding to the selected menu item. The information processing unit accesses to an outside server device to obtain a menu item corresponding to the image and stores it on the memory unit.

(17) By the way, in the above-described (8), the first managing area and the second managing area are formed and managed by independent programs.

(18) In this case, view selection tabs for selecting one of views of a first managing area and a view of a second managing area may be displayed in order to display selectively the managing area at a side of a tab selected through an input unit.

(19) Alternatively, a view of the first managing area and a view of the second managing area may be displayed simultaneously with a frame.

(20) Further, in the above-described (8), when an access is made to an information image file managed in a first markup description language file which is a first managing area, a second markup description language file which may be a second managing area is read out from a memory unit, and, after the second markup description language file is updated so that the second markup description language file manages the information image file, the second markup description language file may be executed.

BRIEF DESCRIPTION OF THE DRAWINGS

FIG. 3 is a diagram showing one example of a table (creation log) recorded by a database of the above-described server device;

FIG. 5 is a diagram showing one example of a table, (update log) recorded by the database of the above-described server device;

FIG. 7 shows one example of the image related information;

BEST MODE FOR CARRYING OUT THE INVENTION

Figure 1:
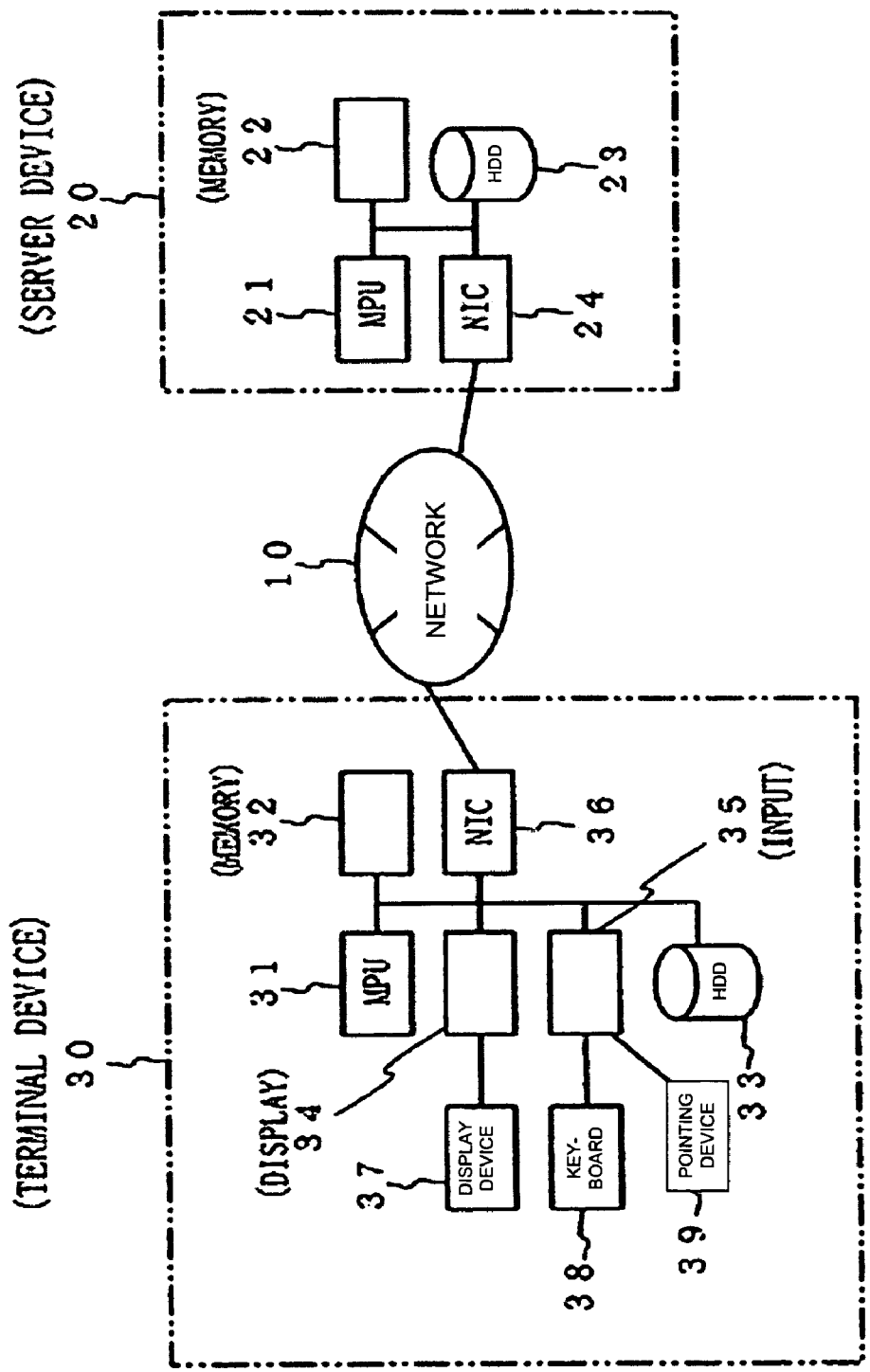
FIG. 1 is a block diagram of a configuration of information supply system to which the present invention is applied.

FIG. 1 is a block diagram showing a configuration of an information supply system to which the present invention is applied.

The information supply system has a server device 20 connected over a network 10 such as Internet and a terminal device 30. While FIG. 1 includes one server device 20 connected to the network 10 and one terminal device 30 for convenience, particular limitation is not intended for the number of the server device 20 and the terminal device 30.

The server device 20 includes a microprocessor (MPU) 21, a memory 22, an operating system (OS), software such as HTTP server, a hard disk drive device (HDD) 23 in which image data and text data are stored, and a network interface 24, for example.

Further, the terminal device 30 includes a microprocessor (MPU) 31, a memory 32, an operating system (OS), an HDD 33 in which HTTP viewer software (web browser), for example, is stored, a display interface 34, an input interface 35, and a network interface (NIC) 36.

A display device 37 is connected to the display interface 34, and an operation screen for the OS, display screen for the web browser, and so on are displayed thereon. Further, a keyboard 38 and a pointing device 39 such as a mouse are connected to the input interface 35, and instructions from a user, for example, is input thereto through those peripheral devices.

Figure 2:
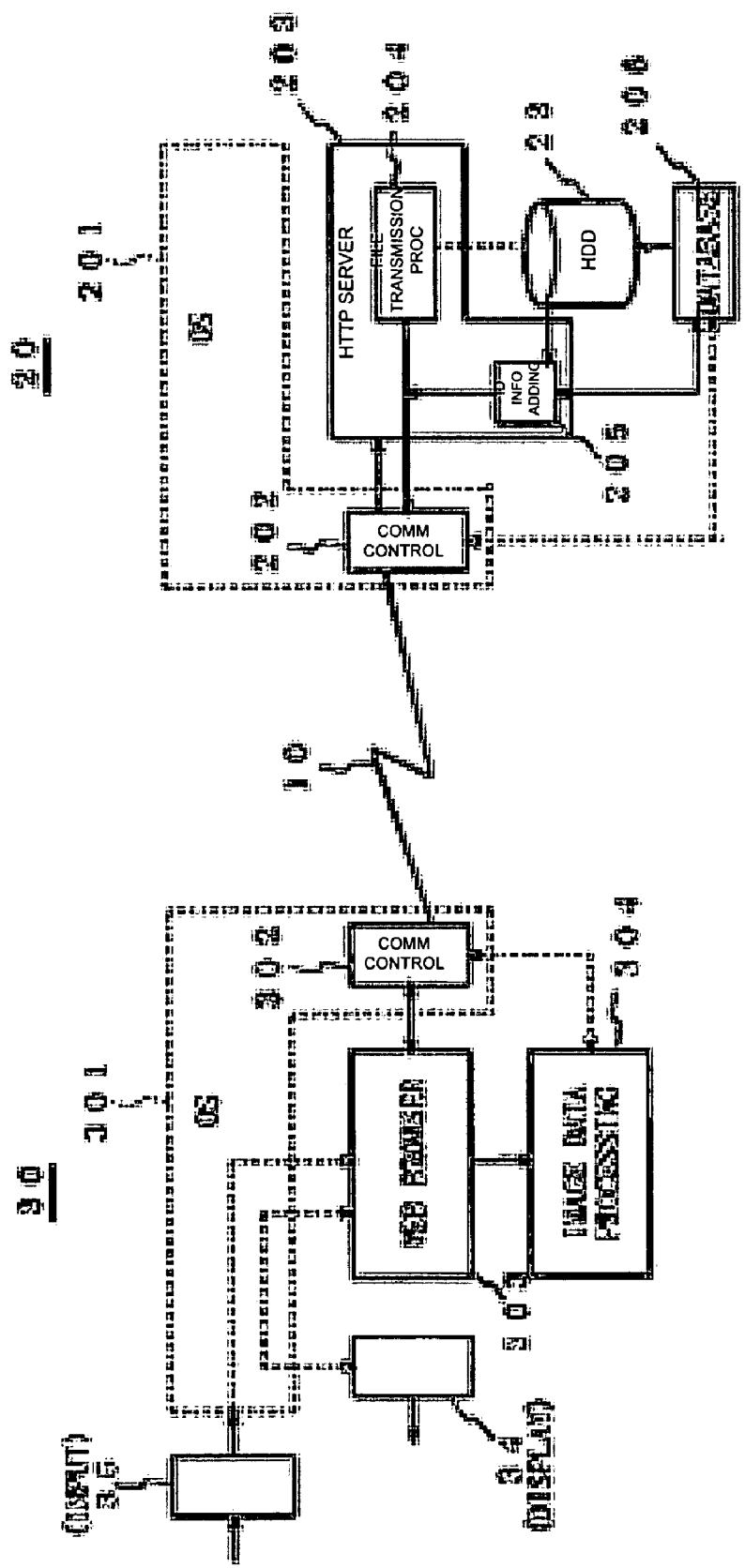
FIG. 2 is a concept diagram showing an outline of operations of a server device and a terminal device constructing the above-described information supply system.

FIG. 2 is a concept diagram showing an outline of function blocks of server device 20 and the terminal device 30.

In the server device 20, control of the entire device, communication control processing 202 for distributing communication processing to predetermined services such as Telnet, FTP, and HTTP based on port information, for example, and processing of an HTTP server 203, for example are executed in parallel under the control of an OS 201.

Further, also in the terminal device 30, control of the entire device, communication control processing 302, input control from a user, processing of an Web browser 303, for example are executed in parallel under the control of an OS 301.

An outline of general operations of the Web browser 303 and the HTTP server 203 will be described below.

When a user manipulates the terminal device 30 through the input interface 35 and inputs an intended address (Uniform Resource Locator: URL, having a portion specifying a host name of a server in which the HTTP server is implemented and a portion specifying a file name), the Web browser 303 sends a connection request including a file name to the server device 20 corresponding to a host name. The connection request is supplied to the intended server device 20 over the network 10 and supplied to the HTTP server 203 through the communication control processing 202.

When the connection request is supplied, the HTTP server 203 reads out data corresponding to the file name in the connection request from the HDD 23 and sends it to the terminal device 30.

A URL instructed first by the user sometimes indicates a host name only or a host name and a particular directory only, and in such a case, a file having a standard name (index.html) in a root directory of a corresponding host or an indicated directory is read out first and then sent to the terminal device 30.

In such a file having a standard name or a file instructed by a user, links to a view of text, a view of an image, and other files, for example, are described according to the HTML (Hyper Text Markup Language).

The file from the HTTP server 203 is supplied to the Web browser 303 through network 10 and the communication control processing 302 of the terminal device 30. The Web browser 303 creates a display image data in accordance to the description of the file and supplies it to the OS 301. The OS 301 deals the display image data from the Web browser 303 as an image in a window to be assigned to the Web browser and display it on a display screen of the display device 37 through the display interface 34.

Here, in the file supplied from the HTTP server 203, for example, when displaying an image along with a file name of image data is instructed, the Web browser 303 requests the HTTP server 203 to transmit image data corresponding to the file name.

When the transmission request is accepted, the HTTP server 203 reads out image data having a requested file name from the HDD 23 and transmits it to the web browser 303.

When the image data is received, the Web browser 303 deals the image data as image data in a predetermined location in the above-described image data and supplies it to the OS 301.

Thus, an image based on the received image data is displayed in a predetermined location in a window of the Web browser 303.

General operations for the Web browser and the HTTP server has been described above, and distinctive operations of the information supply system according to this embodiment will be described below.

[Addition of Identification Information]

In the server device 20, as shown in the above-described FIG. 2, when the HTTP server 203 sends particular image data, executed are identification information adding processing 205 for adding to the image data identification information inherent to an access from a user and processing for the database 206, for example, for storing each identification information, for example.

The identification information adding processing 205 is implemented as an extension program (so-called plug-in) of the HTTP server 203, for example. When file transmission processing 204 within the HTTP server 203 reads out and sends a file of the particular image data from the HDD 23, the identification information adding processing 205 adds identification information inherent to an access from a user to the image data.

Since the identification information added to the image data is enough if it is information inherent to each access, it can be created based on information such as an IP address of the terminal device 30 operated by a user and access date and time to the server. Alternatively, identification information to which image data is added may be created by also using the inherent identification information given to every user or every terminal device 30 for the image data processing 304 handling image data to which identification information is added as described later.

Conversely, access date and time themselves may be used as identification information. Since two or more accesses to one server device 20 are not processed simultaneously in general, only access date and time are enough for defining each access. Therefore, each image data can be identified even when access date and time are added to the image data as identification information.

Further, as a function of the HTTP server, a function for recording a log of accesses from a user is implemented, and it is possible to record an IP address of the terminal device 30 of a user using the HTTP server, access date and time, and so on in the access log. Thus, when access date and time are used as identification information, the access log is referenced so that an IP address can be obtained which corresponds to the access date and time added to the image data. Therefore, the IP address of a user accessing to the image data can be identified easily.

[Construction for Adding Identification Information]

Further, since addition of identification information is enough if it is performed to allow identification of image data (image file), it may be added to a vacant area defined on an image file format, for example, or may be embedded in image data by using so-called electronic watermark technology which diffuses and adds it into the image data, or may be added in front or rear of a body of the image data on the image format. Furthermore, identification information may be added as it is so as to suppress processing loads, or may be added after processing of proper encoding and encryption for improving security, for example.

The image data to which identification information is added is handled similarly to general image data on the file transmission processing 204 and the communication control processing 202 and is sent to the Web browser 303 of the terminal device 30.

[Management of Access Log of Image Data]

Further, the database 206 obtains information indicating conditions of user access through the OS 201 and the HTTP server 203, for example, creates a table (creation log) showing a correspondence relationship of information indicating user access conditions, and records it on HDD 23. The creation log includes, as shown in FIG. 3, for example, an accessing IP address, a host name of the server device 20 in which the HTTP server 203 operates, access date and time, a file name of image data, and identification information (ID) added by the identification information adding processing 205.

Thus, by referring to the creation log (or update log described later), identification information to which image data is added, an accessing IP address, information indicating user access conditions such as access date and time can be obtained. Therefore, researches of user access conditions and so on can be performed relatively easily.

[Addition of Pointer Information in Server Device and Access to Pointer Information in Terminal Device]

By the way, the identification information adding processing 205 can add information such as a URL in addition to identification information to image data.

When a URL is added to image data, the URL is extracted at the terminal device 30 and the URL is supplied to the Web browser 303 in order to instruct an access, an access can be performed to the predetermined URL by referring to image data only.

Conventionally, a so-called banner advertisement is one in which such a function is realized through HTTP server, but in the banner advertisement, it is required processing for defining a button for linking it to a predetermined URL in accordance with the HTML and specifying a file name of predetermined image data as an image of the button.

In this case, since a file defining a URL and a file of image data are separated, a third person can easily refer to only a file of the image data as an image of a button having a different link from one for the original URL. That is, image data can be illegally used in easier manner for applications that a creator of the image data does not intend.

On the other hand, like the information supply system, identification information inherent to user access conditions is added to image data in advance so that paths for obtaining image data, for example, can be relatively easily specified by referring to the above-described creation log even if the image data is illegally used. Thus, it is effective for preventing illegal use of the image data.

Further, since identification information is added into image data, the identification information can be maintained with more reliability than that for researches using conventional Cookie or the like, which increases reliability of research results.

For example, by adding the above-described identification information into advertisement image data such as banner advertisement, an advertiser can obtain a highly reliable research result regarding user preferences with compared to a conventional case, and it is possible to provide one-to-one services appropriately corresponding to needs of individual users by using the research result.

In FIG. 2, while an example where the identification information adding processing 205 is implemented as an extension program of the HTTP server 203 is shown, it can be implemented as processing for place an image file, for example, in a file server independent from the HTTP server in advance, monitoring an access to the file server, and sending out image data to which identification information corresponding to an access from a user is added when an access request is received for a predetermined image file because it is enough if it has a function to add, to the predetermined image data, identification information inherent to the access from the user.

In this case, the HTTP server and the file server, for example, are not necessary to be implemented as separate devices, but they may be executed as a plurality of server programs and identification information adding processing, for example, on a single OS. Alternatively, it is possible, by using a so-called emulator, to execute a plurality of OSs on a single device, execute processing as HTTP server on one OS, and execute processing as file server, for example on another OS. Thus, equivalent processing can be executed with a plurality of devices through they are physically one device.

By separating the HTTP server and the file server, for example, in this way, an access right, for example, can be set in the HTTP server and the file server, for example, separately, which increases flexibility for setting security, for example. Therefore, it can contribute to the improvement of security.

[Manipulation of Image Data in Terminal Device]

On the other hand, in the terminal device 30, as shown in the above-described FIG. 2, by executing an application program operating in collaboration with the Web browser 303, for example, processing for handling image data to which inherent identification information is added (image data processing) 304 is executed.

The image data processing 304 performs processing corresponding to identification information when the image data to which the identification information is supplied from the Web browser 303.

This processing includes management for saving, deleting, and updating, for example, image data based on identification information, for example, and, when information such as URL is added to the image data as described above, further includes processing for executing it in accordance with the information. Furthermore, when a program is embedded in image data, processing for executing the program is included.

A detail of each processing will be described below.

Figure 4:
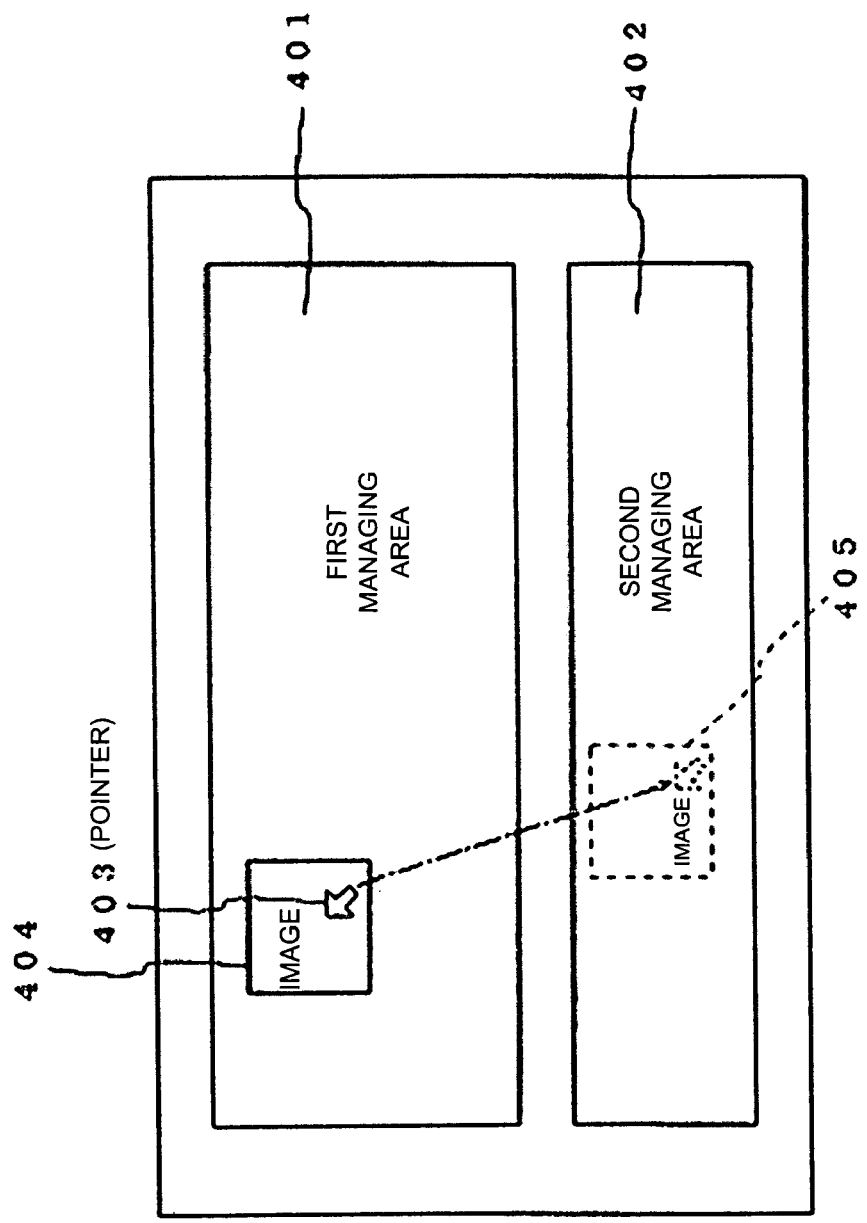
FIG. 4 is a diagram showing one example of an image displayed on a display device of the above-described terminal device.

As shown in an example of display screen of a display device 37 in FIG. 4, a window 401 (a first managing area) as well as a window 402 (a second managing area) of the Web browser 303 are assigned to the image data processing 304 by the above-described OS 301.

Image data can be supplied from the Web browser 303 to the image data processing 304 under the control of the OS 301 by a so-called drag and drop operation.

That is, image data is supplied from the Web browser 303 to the image data processing 304 through the OS 301 by operating a pointing device 39 by a user, matching a pointer 403 to a displayed position of an image 404 displayed within the Window 401 of the Web browser 303, under a condition where a button, for example, of the pointing device is manipulated, moving the pointer 403 onto the window 402 of the image data processing 304, and releasing the operation of the button of the pointing device 39.

When image data is supplied, the image data processing 304 displays an image 405 corresponding to the supplied image data at a position of the pointer 403.

The image data is stored by the image data processing 304 at a predetermined area of the HDD 33 through the OS 301 when the image data is supplied through the above-described drag and drop operation. Further, image data is deleted by deleting image data selected by an instruction from a user from the predetermined area of the HDD 33.

[Update Processing of Image Data to Which Information is Added]

Image data is updated in order to update stored image data to latest one at that time. The update processing may be executed in accordance with an instruction from a user, for example, or may be executed based on information such as creation date recorded in a file of image data. Further, it may be executed automatically for every predetermined interval.

When the update processing is started, the image data processing 304 extracts identification information added to image data to be updated and sends it to the HTTP server 203 and the database 206 the identification information and file name, for example, in order to request update of the image data.

The update request is supplied to the HTTP server 203, and the database 206 as a packet of a predetermined port through communication control processing 302, the network 10, and the communication control processing 202.

When updating, the image data processing 304 may send entire image data, and the HTTP server 203 or the database 206 may extract identification information form the obtained image data.

Further, inherent identification information (client ID) is given to the image data processing 304 for every user or for every terminal device 30. The client ID is supplied to the HTTP server 203 and the database 206 as a packet of a predetermined port through the communication control processing 302, the network 10 and the communication control processing 202 when image data is updated, for example.

The file transmission processing 204 of the HTTP server 203 instructs the HDD 23 to read out image data corresponding to a file name being requested for update.

Here, the identification information adding processing 205 creates new identification information corresponding to a user access condition and adds it to image data.

Thus, image data to which the new identification image is added is supplied to the image data processing 304 of the terminal device 30 through a predetermined port.

On the other hand, the database 206 obtains information indicating a user access condition through the HTTP server 203, for example, creates a table showing a correspondence relationship between identification information added by the identification information adding processing 205 adds newly and information indicating a user access condition (update log), and records it on the HDD 23 separately from the above-described creation log.

Like the creation log, as shown in FIG. 5, the update log includes an accessing IP address, a host name of the server device 20 to which identification information is added newly, access date and time (update date and time), a file name of image data, identification information added by the identification information adding processing 205 as well as information for identifying the server device 20 having created original identification information (creating server ID) and a client ID for identifying the terminal device 30 used by a user or the user.

Thus, by referring to the update log, updates of image data and information for identifying a user or the terminal device 30 can be obtained in addition to user access conditions obtained by the above-described creation log. That is, researches on user preferences, for example, can be performed relatively easily through image data update conditions, for example.

Further, by referring to the update log, a path for obtaining image data, for example, can be identified accurately since information for identifying a user or the terminal device 30 corresponding to identification information added to the image data can be obtained.

[Access to Pointer]

As described above, when information such as URL is added to image data, the image data processing 304 extracts added information and executes processing in accordance with the extracted information.

More specifically, if the added information is URL, the image data processing 304 records the URL in advance and instructs the Web browser 303 to access to the URL when a user instructs an access to the URL.

Therefore, the user can access to the URL easily by causing the image data processing 304 to supply the image data to which desired URL is added from the browser 303. That is, image data functions as a link to a particular URL.

While a so-called bookmark is known as one having the function, an actual linked location is sometimes difficult to identify since it is stored as text information. On the other hand, a link through image data allows identification of the linked location instantly by an image, which is easier to understand than the link by characters.

Further, as on for indicating a link to a predetermined URL by an image, while the above described banner advertisement is known, only storing image data does not cause a linked URL to be stored since the image data and the linked URL are independent from each other in this case.

Further, since the banner advertisement may be updated after a short period of time and therefore same image data, that is, a same linked URL cannot be always obtained at the next access, the linked URL must be stored by creating a bookmark, for example when the linked URL must be surely stored.

On the other hand, if it is image data to which information such as URL is added, the image data processing 304 extracts a URL in order to allow accesses to the URL by simply storing it, which makes operations easier.

In the above-described FIG. 2, while an example is shown where the image data processing 304 is implemented as processing independent from the Web browser 303, it can be implemented as an extension program of the Web browser 303 (so-called plug-in) because it is enough if it has a function to handle information to which image data is added.

Furthermore, the present invention is not limited to the above-described embodiment, and the construction and the implementation method can be changed properly within the scope of the technological spirit of the present invention.

For example, in the above-described FIG. 1, while the server device 20 and the terminal device 30 are shown as single devices, respectively, a program for executing their processing can function as both server device and terminal device.

The above-described embodiment will be described further in detail below.

[Construction of Image File]

Figure 6:
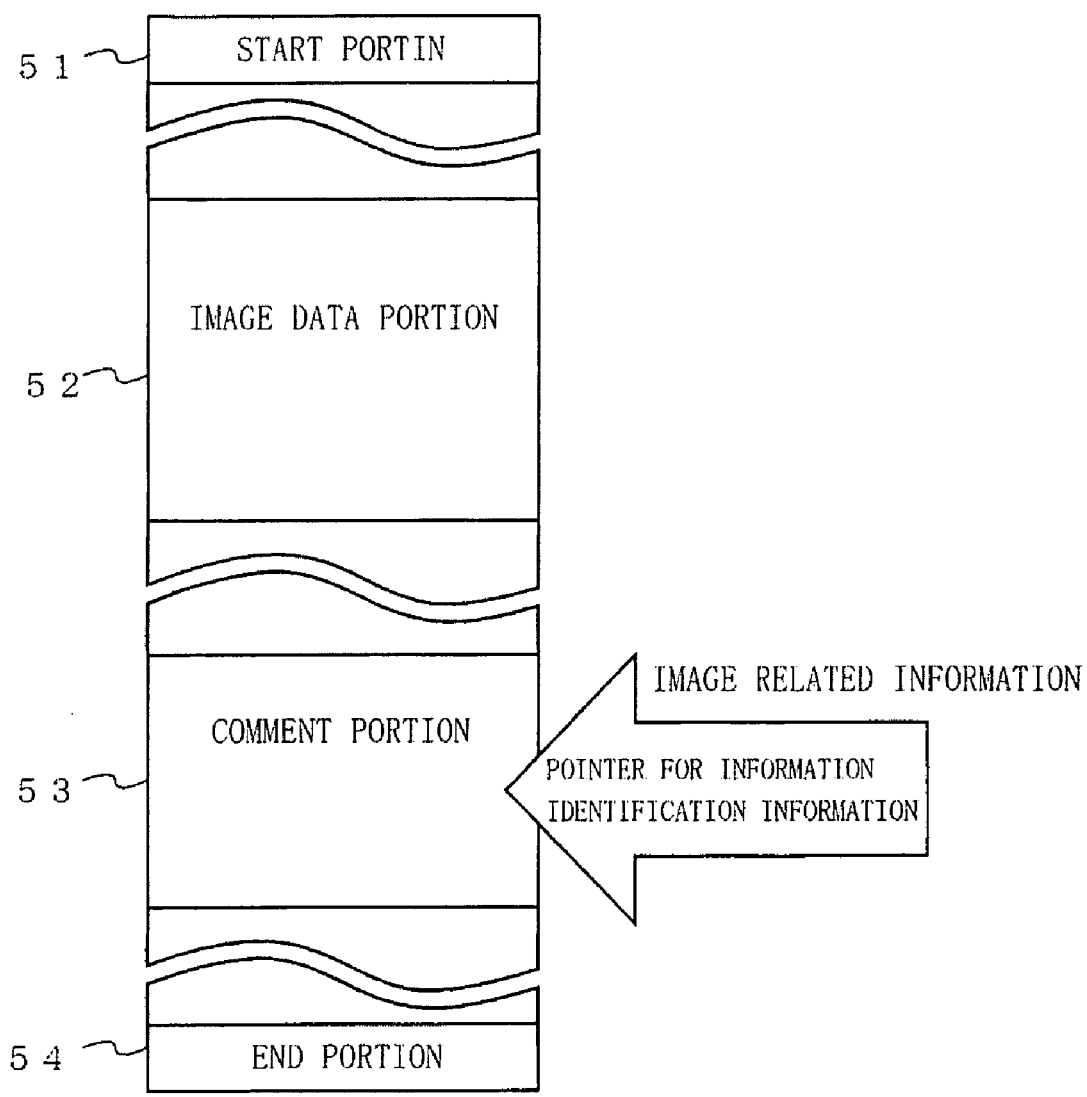
FIG. 6 is a construction diagram of an information image file showing a storage construction of image related information.

FIG. 6 is one example of a data construction of image file handled in the above-described embodiment. The image file shown in FIG. 6 includes a start portion 51 indicating the beginning of a data stream, an image data portion 52 for describing displayed data of an image, a comment portion 53 for describing image which is not influence on a view of an image, and an end portion 54 indicating an end of the data stream. For example, a JPEG file and GIF file adopt such a data construction. Identification information which is added to the above-described image data and/or pointer information such as a URL can be described in the comment portion 53 as information which does not influence on a view of the image. Further, even if it is in another image format, it can be described in a corresponding area if it is in a format having an area for information which does not influence on the view of the image. Further more, in the data stream of the image file, identification information inherent to the image file, pointer for one or a plurality of information, an index for a menu item corresponding to the image file, and/or an entity of a program can be written in an area which is ignored when the image is displayed. Also, as described above, they can be added to image data by using a digital watermark technology.

In the description below, identification information added to image data, pointer information and the like are referred to "image related information". Further, an image file in which image related information is added to image data is referred to "information image file".

[Construction of Image Related Information]

FIG. 7 is a construction diagram of image related information. Image related information shown in FIG. 7(*a*) includes information of an image name, a password, an expiration date, a thumbnail image, category, and keyword.

The "image name" is a name of an image which is thumbnail-displayed on the window 402 of the image data processing 304. The "password" is a password which requires a user to input when an information image file is supplied to the image data processing 304. Only users who know the password can register the information image file in the image data processing 304. The "expiration date" is an expiration date of the information image file supplied to the image data processing 304, and the information image file is removed from a recorded area of the HDD 33 at the expiration of the period. The "thumbnail image" is data of an image file which is replaced by an image displayed on a browser and thumb-nail displayed on a window of the image data processing 304 when the information image file displayed on the browser is supplied to the window of the image data processing 304. The "category" is data for specifying a folder in which information image file is stored when the information image file is supplied to the image data processing 304. The image data processing 304 creates newly a folder having a specified name when a specified folder does not exist. The "keyword" is a word which is used as a search key when information image file having been supplied by the image data processing 304 is searched.

Image related information shown in FIG. 7(*b*) is constructed by assigning a command name, an action table, and a mouse (pointing device) operation to each pointer information and associates them with a platform as one pair.

The "pointer information" indicates a location of a file on a local computer or over a network. For example, the pointer information includes a file name, a path name indicating a location of resources on the local computer, Universal Naming Convention (UNC) indicating a location of resources in a network environment, Uniform Resource Locator (URL) indicating a location of resources on Internet or Intranet, or Uniform Resource Identifiers (URIs). The "command name" is a view name used when displaying a content of a pointer on a menu. For example, it is "Access To Homepage". Here, the "menu" is a menu which is displayed and can be selected therefrom on a display unit 37 when a right button of the mouse 39, for example, is clicked. The "action table" indicates operations of the image data processing 304. A content of a specified operation includes whether or not a file indicated by pointer information added to the information image file is stored in the HDD (storage unit) 33 of the terminal device 30 when the information image file is supplied to the image data processing 304, whether or not the file is automatically executed, and a method for executing the file (telop display, video replay, voice replay, and so on). The "assigning mouse operation" sets a mouse operation for accessing pointer information. Types of setting includes double click, Shi+ double click, Ctrl+ double click, Alt+ double click, and so on. The "platform" specifies an environment (platform, OS) matching with a file indicated by pointer information. For example, when the OS 301 is Windows (Trademark), the image data processing 304 selects a pointer for information corresponding to Windows and displays it on the above-described menu.

[Access to Pointer Information]

A method for accessing a pointer recorded in an information image file in the terminal device 30 will be described.

(1) Method through Menu Selection

Figure 8:
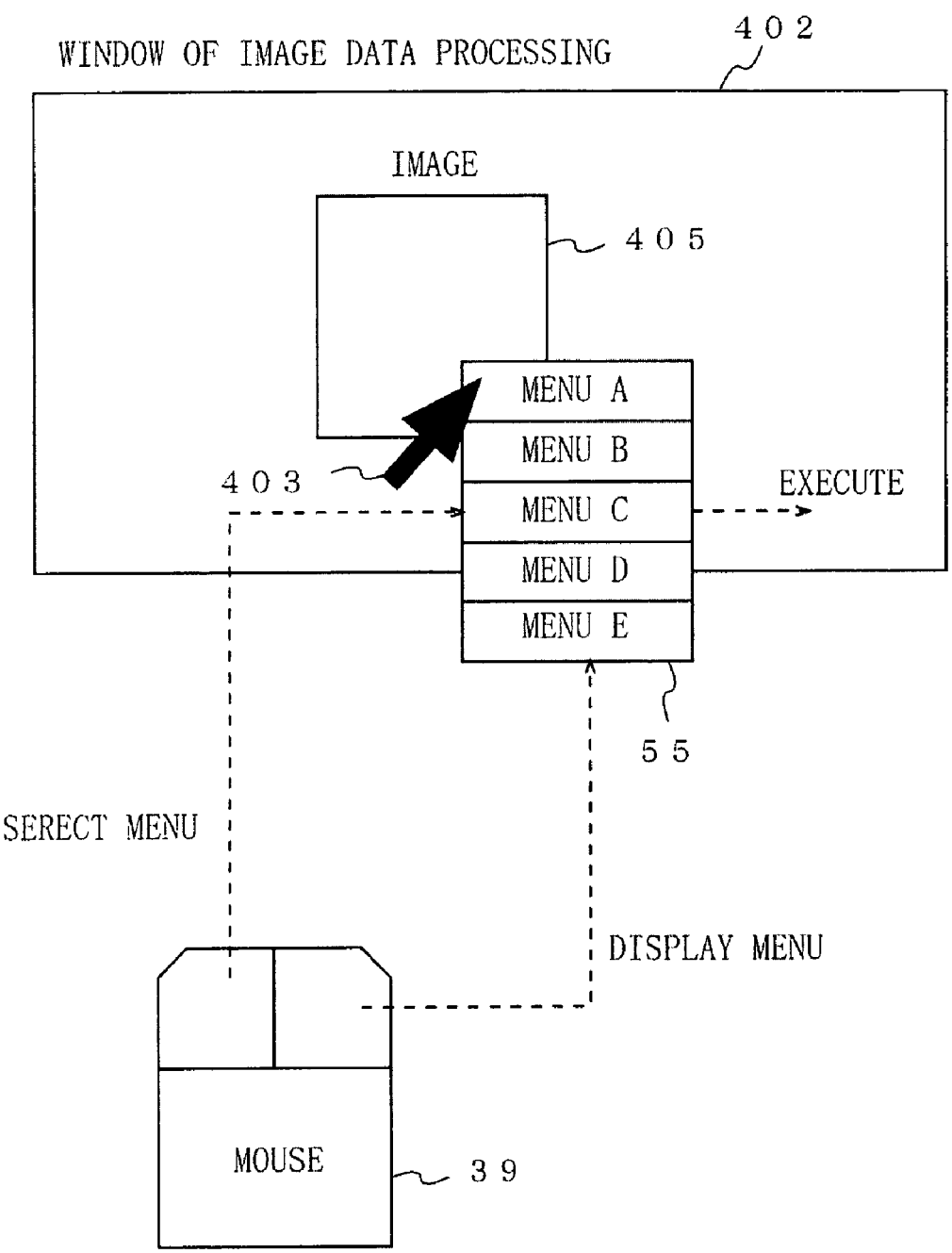
FIG. 8 is an explanatory diagram of an access to a pointer through menu selection.

FIG. 8 is an explanatory diagram of a method for accessing a pointer through menu selection. A user operates the mouse 39 (pointing device) and places the pointer 403 on an image 405 supplied on the window 402 of the image data processing. Next, the user clicks a right button of the mouse 39. When an MPU 31 (information processing unit) detects the click, it reads out image related information included in an information image file corresponding to the image 405 (FIG. 7 (*b*)) from a recording unit 33 in order to create menu display data. That is, a "command name" is extracted as a menu item and a menu 55 is displayed on a display unit 37. Next, the user operates the mouse 39 in order to move the pointer 403 and places it on a menu item to be selected. Then, a left button of the mouse 39 is clicked in order to select and determine one menu item. When the MPU 31 detects the click, it refers to image related information (FIG. 7 (*b*) and inputs pointer information corresponding to the selected command in the browser 303 in order to access to the pointer. When the MPU 31 receives a file sent from a server based on accessed location, it executes the received file in accordance with an action table corresponding to the command selected at that time. For example, video is replayed by a Real Player trademark).

Here, menu items displayed when clicking an image displayed on the window 402 of the image data processing are determined depending on contents of image related information embedded in the information image file. Further, the information image file including image related information is sent from the server device 20. That is, it is characterized that menu items displayed by a mouse click is determined depending on information downloaded from the server device 20.

(2) Method Through Mouse Operation

When a button of the mouse 39 is manipulated and a key of the keyboard 38 are manipulated under a condition where the window 402 of the image data processing is selected, an access to a predetermined information pointer can be done corresponding to the manipulation. When the mouse 39 is operated and the keyboard 38 is operated, the MPU 31 refers to image related information and refers to the "Assigning Mouse Operation" (FIG. 7(*b*)) in order to determine whether or not a corresponding operation is defined. When the corresponding operation has been defined, pointer information corresponding to the operation is read out and the pointer is input to the browser 303 in order to access to the corresponding pointer. When the MPU 31 receives a file returned from a server based on an accessed location, the received file is executed in accordance with an action table corresponding to a command name selected at the time. Here, a same mouse operation may be assigned to a plurality of actions.

[Specific Example of Access to Information Pointer]

Figure 9:
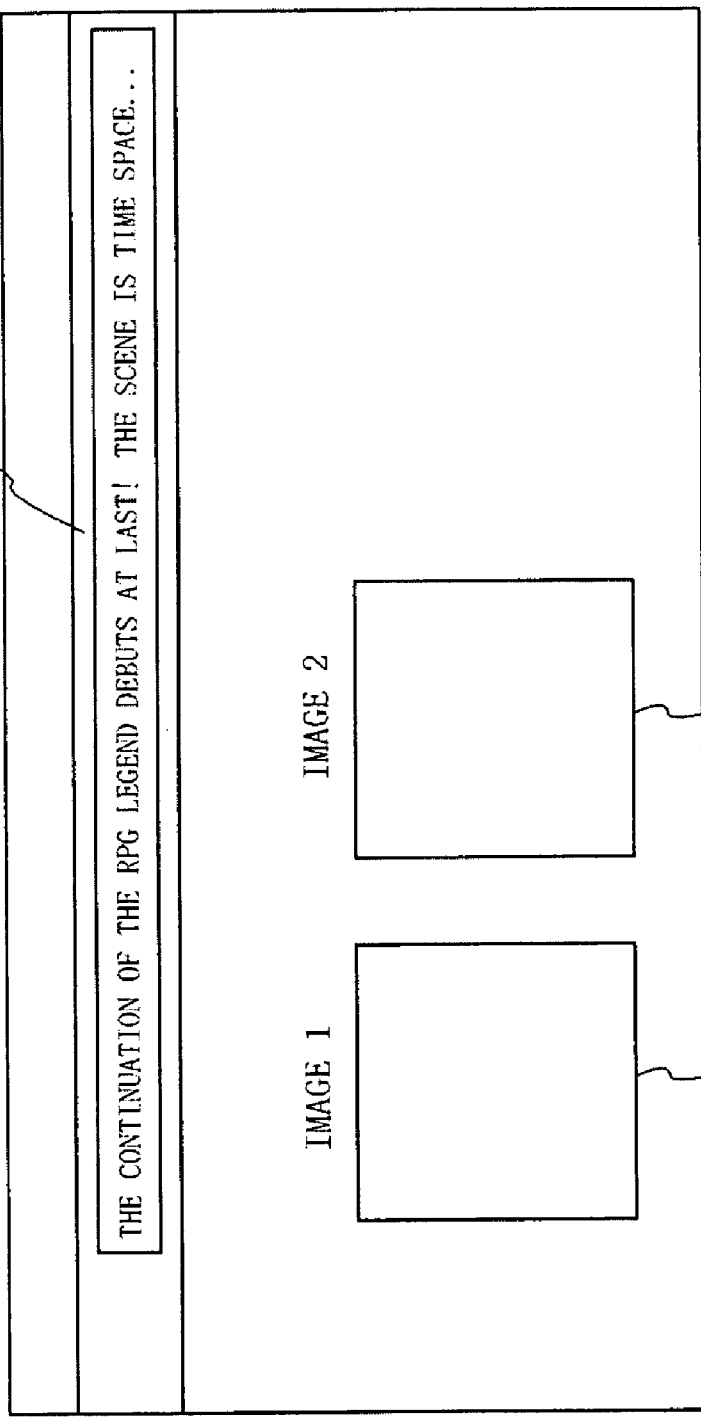
FIG. 9 is an explanatory diagram of telop display processing.

Next, a specific example of an operation when accessing to a pointer for information will be described. Here, an example of "telop display" indicated in the action table in FIG. 7(*b*) will be described. FIG. 9 is an explanatory diagram of a telop display operation. When a "telop display" is defined in the action table, a pointer in which a text file of a telop is defined for corresponding pointer information, and simultaneous download and storage of information image file into a local disk of the text file and action (control code) of the telop display are defined for the action table. Further, in order to assign a mouse operation, a single click of the left button is defined (the definition above is performed by an information image supplier at the server in general).

When an information image file having the image related information is supplied from the browser 303 to the image data processing 304 in the terminal device 30, the MPU 31 refers to the image related information and starts an access to a pointer defined for "save". Then, a text file of the telop is downloaded from a server corresponding to the pointer and save it in the local HDD 33.

After that, When the user operate the mouse 39 in order to click and select an image displayed on the window 402 of the image data processing, the MPU 31 refers to image related information corresponding to the selected image, and when it determines that the control code defined in the action table is "telop display", a long and narrow window for telop display is displayed within an area (it may be outside of the area) of the image data processing shown in FIG. 9 so that text of the telop read out from the HDD 33 is scroll-displayed in the window. As shown in FIG. 9, when a plurality of images 405 and 405 are supplied, telops each of which is different depending on an image selected by the mouse 39 can be displayed.

[Supply of Information Image File to Image Data Processing]

In the above-described embodiment, it has been described that the information image file can be supplied to the image data processing by performing a drag and drop action from the window 401 of the browser to the window 402 of the image data processing. Here, another supply method will be described.

(1) Drag and Drop from Menu

Figure 10:
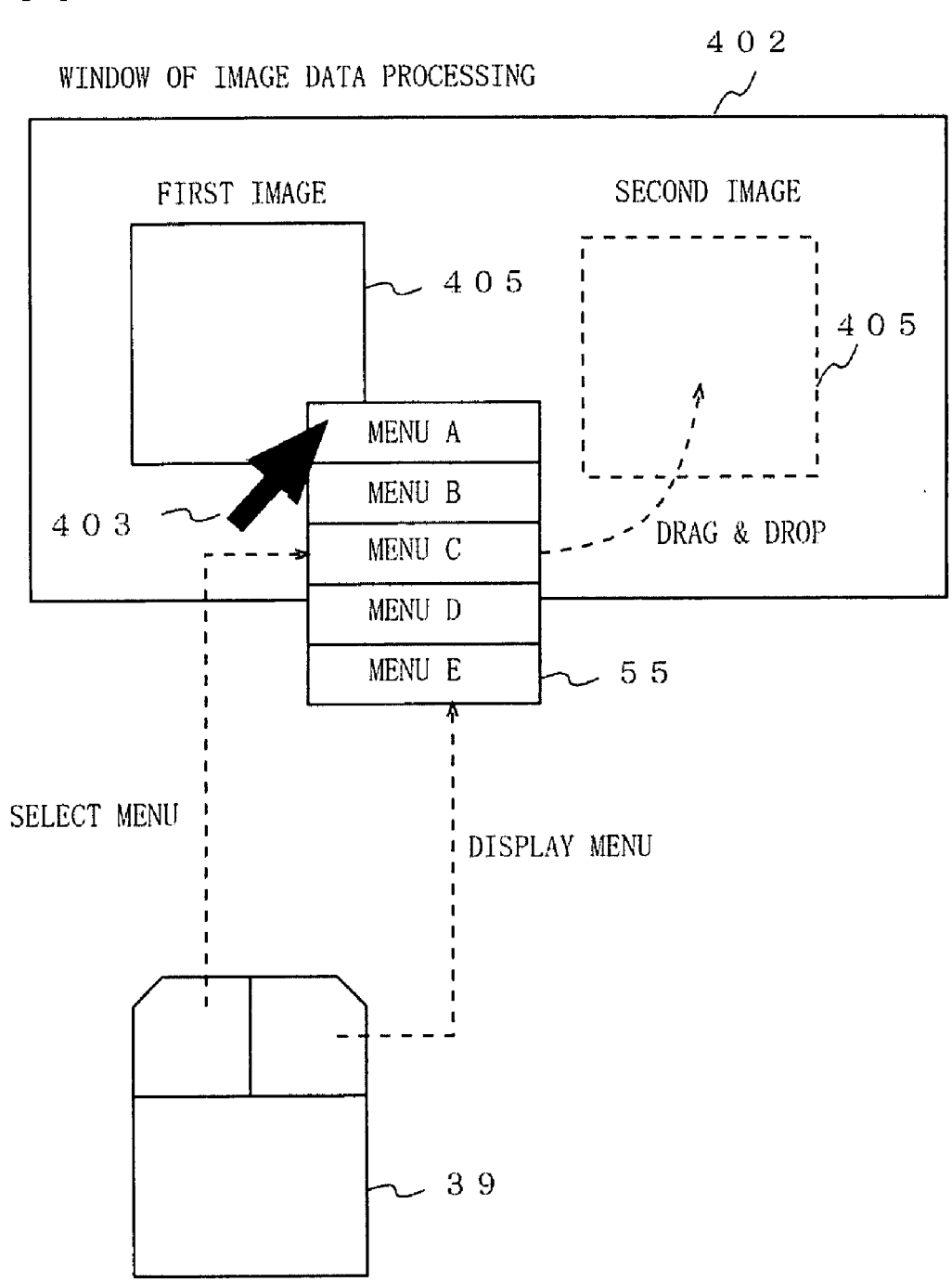
FIG. 10 is an explanatory diagram of information image addition through a drag and drop action from a menu.

FIG. 10 is an explanatory diagram of a drag and drop operation from a menu. As described above, a menu 55 (first managing area) is displayed by a right button click of the mouse 39 in order to select a menu item for information image addition through the mouse 39. For the menu for information image addition, as defined in the last row in FIG. 7(*b*), a control code in the action table is defined to a control code specifically for image addition in advance. When the user operate the mouse 39 and performs a drag and drop operation on the menu item for information image addition into the window 402 (second managing area) of the image data processing, the MPU 31 detects the operation and refers to the image related information (FIG. 7(*b*)). Then, the control code in the action table corresponding to the operated menu item is checked, and when it is determined as "Add Image", an access to a corresponding pointer is started. When a new information image file is downloaded from a predetermined server in response to the access, the MPU 31 supplies information image file from the browser 303 to the image data processing 304 and further supplies the newly downloaded information image file to the image data processing 304.

It produces a merit that a browser does not need to be activated each time for supplying a new information image file.

Of course, the menu item for information image addition may be clicked by the mouse 39 simply in order to download the new information image file and supply it to the image data processing 304.

Further, the new information image file may be stored within another information image file which has been supplied already. In this case, when the menu item for information image addition (first managing area) is dragged and dropped, for example, the MPU 31 does not access to a server on a network but refers to image related information of an information image file which is a current subject, reads out another information image file registered in advance therein, and supplies it to the image data processing 304 (second managing area).

In this case, there is an effect that it is not necessary to connect to a server on a network each time for supplying a new information image file.

(2) Drag-and-Drop from Mail Software

An information image file may be supplied to the image data processing 304 by dragging and dropping an information image file attached to mail software to the window 402 of the image data processing. A viewing window for a mail body or a check window for an attached file will be a first managing area. In this case, since the information image file is transported by placing it on an e-mail in order to be available for a receiver, information can be spread widely and effectively.

(3) Drag-and-Drop from Arbitrary Folder

An information image file copied in a predetermined folder once from a browser or mail software may be supplied by dragging and dropping it from a corresponding folder (first managing area) to the window 402 (second managing area) of the image data processing. The MPU 31 detects the drag-and-drop operation from an arbitrary folder to the window 402 of the image data processing and supplies an information image file to the image data processing 304 in the same manner as the above-described drag-and-drop processing from the browser.

(4) Non-Drag-and-Drop Supply Method

An information image file can be supplied to the image data processing 304 even by replacing the above-described drag-and-drop operation by another operation. For example, the MPU 31 may detect that an information image file managed outside of the image data processing 304 is clicked in order to supply the information image file to the image data processing 304. Further, when the information image file managed outside of the image data processing 304 is copied on a clip board and then it is pasted from the clip board onto the window 402 of the image data processing, the MPU 31 may detect the operation and supply the information image file to the image data processing.

(5) Supply from Recording Medium Such as CDROM

Further, the information image file may be supplied from a computer readable recording medium such as CDROM. In this case, an information image file displayed on a folder (first managing area) of the CDROM may be supplied to the image data processing 304 (second managing area) through the above-described drag-and-drop operation, a click operation, and a copy-and-paste operation, for example, or an installer may be activated automatically at the start of the CDROM and the installer may supply an information image file recorded on CDROM, for example, to the image data processing 304. Further, when the installer supplies an information image file, the installer may detect an information image file which has been supplied to the image data processing 304 already in order to select an un-supplied information image file only and then supply it to the image data processing 304.

According to this, an information image file can be distributed as a supplement of a magazine, and it can be distributed to general users in order to cause them to use it.

[Construction of First Managing Area and Second Managing Area]

While, as shown in FIG. 4, a first managing area and a second managing area may be provided by independent windows (process, program), respectively, another embodiment can be implemented. Several embodiments will be described below.

Figure 11:
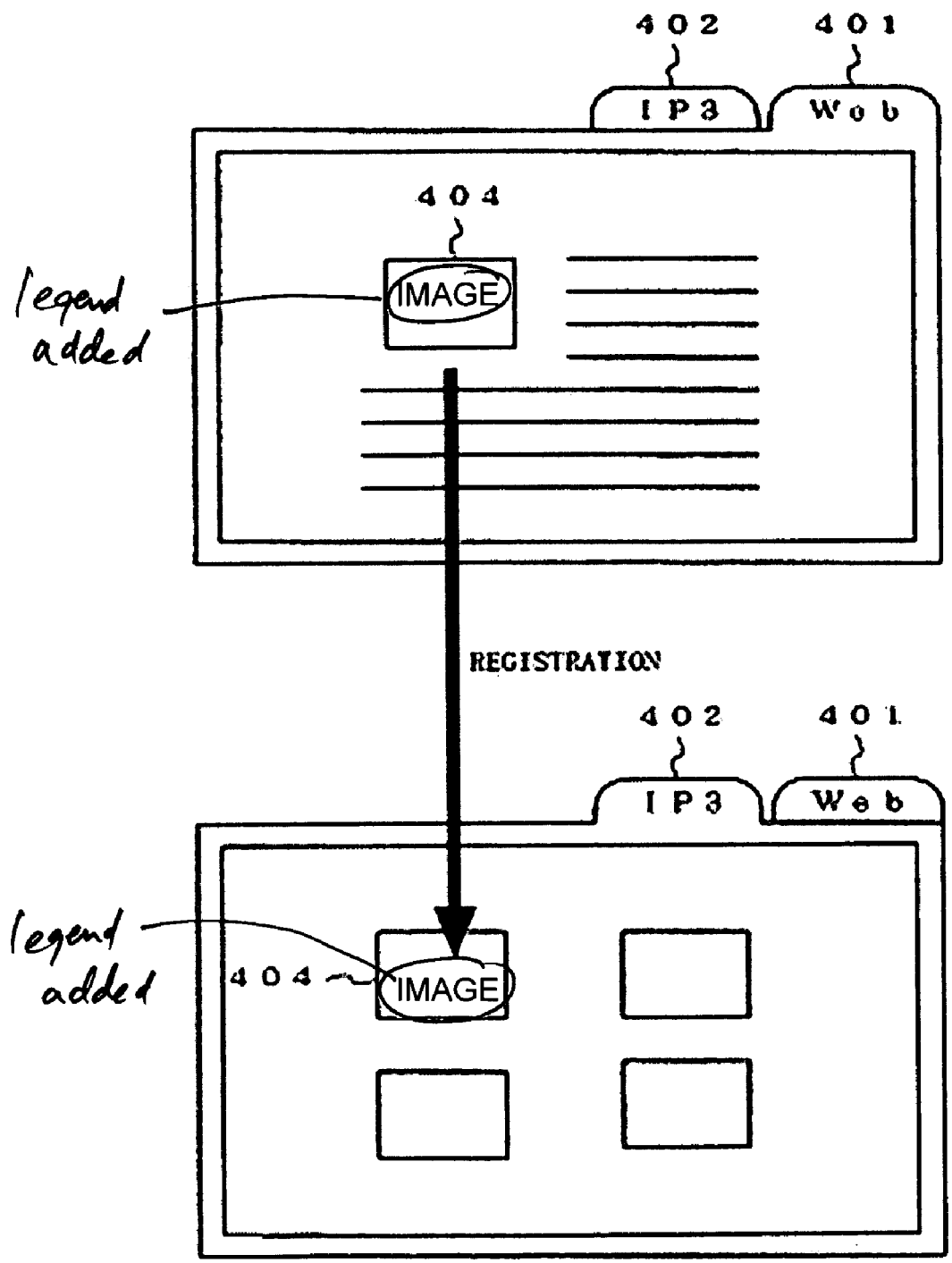
FIG. 11 is an explanatory diagram of an embodiment in which a view of a first managing area and a view of a second managing area are switched through tab selection.

FIG. 11 is an embodiment where a window 401 of a Web browser and a window 402 of image data processing are provided by a single program in order to ask to select a display selection tab at the upper portion of the window through an operation of an input unit 35 and selectively display a window of a selected one. First of all, an information image file 404 displayed on the window 401 of a Web browser is accessed in order to register in the window 402 of the image data processing in the background. As a method for accessing to the information image file 404, the above-described various methods can be adopted. Next, a display selection tab is operated through the input unit 35 in order to display the window 402 of the image data processing. Thus, the information image file having been registered in the image data processing can be accessed.

Figure 12:
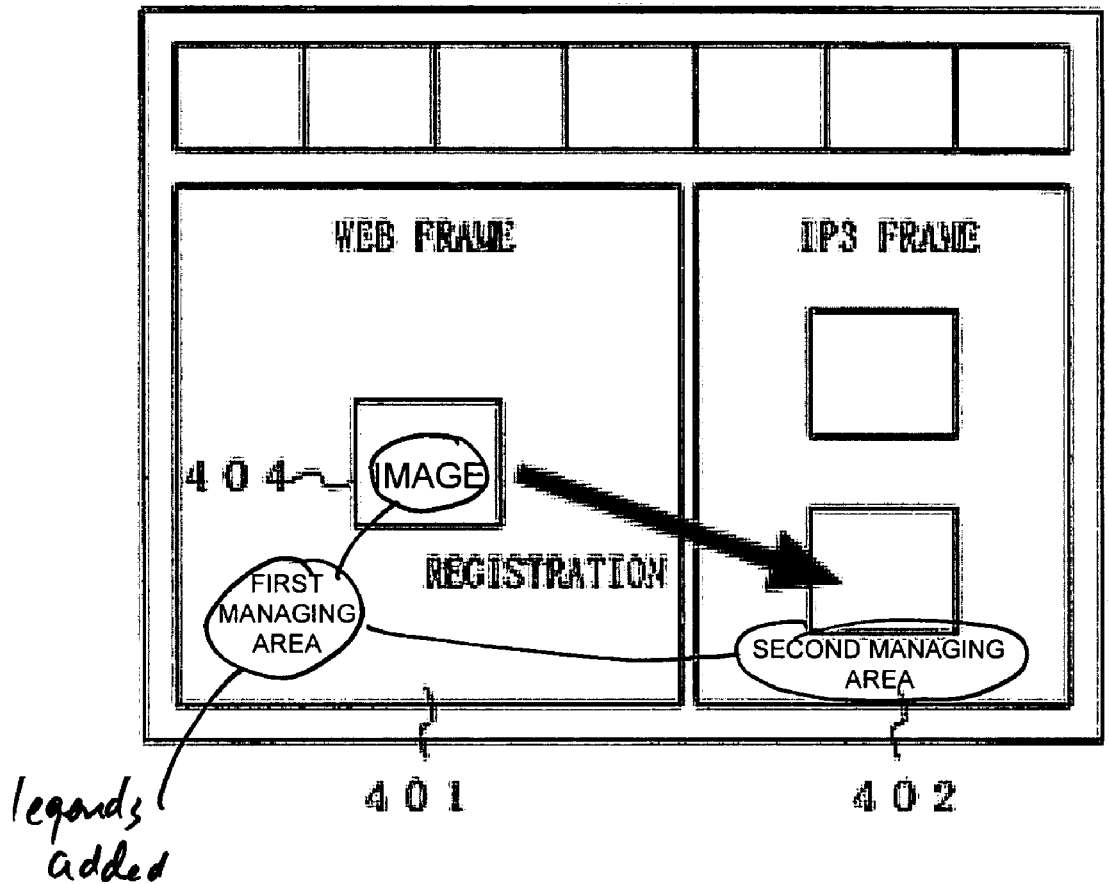
FIG. 12 is an explanatory diagram of an embodiment in which the view of the first managing area and the view of the second managing area are separated by frames in order to display them simultaneously.

Further, FIG. 12 includes a display window in a frame structure, where one frame is provided as the window 401 of the Web browser and the other frame is provided as the window 402 of the image data processing. In this case, while an access operation is easier that drags and drops the information image file 404 from the frame 401 of the Web browser to the frame of the image data processing, the information image file can be supplied to the image data processing through the above-described other access methods.

Figure 13:
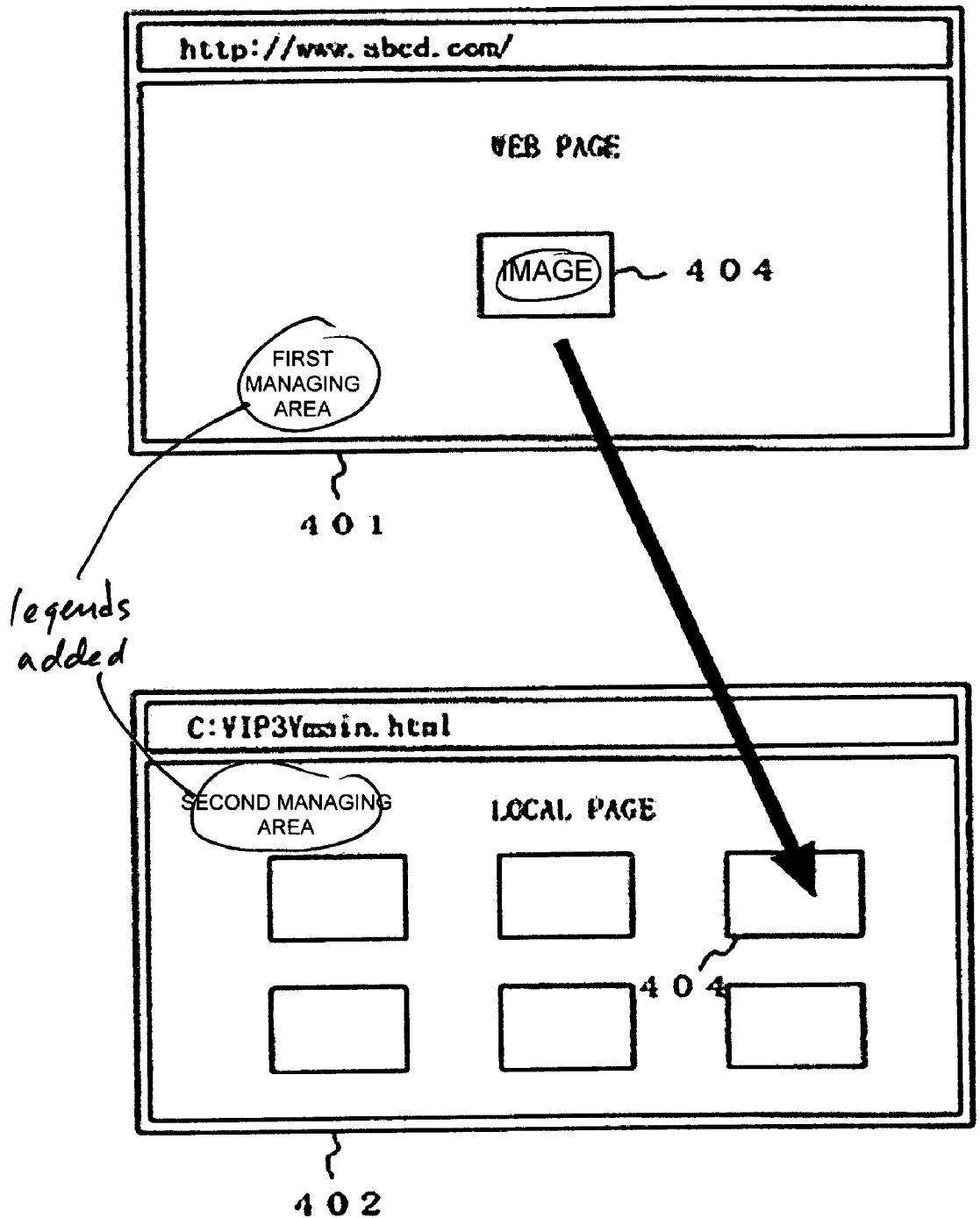
FIG. 13 is an explanatory diagram of an embodiment in which the second managing area (HTML) is displayed after updated and a new information image file is managed when the image file is accesses in the first managing area (HTML).

Further, in FIG. 13, when an access is made to the information image file 404 displayed on the window 401 of the Web browser, a processing unit 31 activates a plug-in implemented in advance in the Web Browser. As an access method to the information image file, the above-described various methods can be adopted. The activated plug-in adds management of a new information image file to a local HTML file stored in the storage unit 33 as a second managing area in advance. Then, the local HTML file to which the new information image has been added is expanded on the Web browser as the second managing area 402. When the local HTML file is expanded on the Web browser, it may be expanded on an existing Web browser or may be expanded separately by starting a new Web browser.

[Encryption of Image Related Information]

Next, encryption processing on image related information added to image data will be described.

[Encryption Processing in Server Device]

Identification information adding processing 205 of the server device 20 includes a function for encrypting image related information to be added to image data for addition. An encryption algorithm performs update after a predetermined period of time. By encrypting image related information, it can be prevented from that a third party adds, deletes, and modifies image related information illegally in order to use an image file.

[Decryption Processing in Terminal Device]

In the terminal device 30, when referring to the image related information added to image data, the MPU 31 decrypts image related information. The decryption algorithm is stored in the HDD 33 in advance corresponding to the encryption algorithm, in the server device 20. However, since the encryption algorithm of the server device 20 is updated after a certain period of time, when the encryption algorithm of the server device 20 is updated, it is necessary to update the decryption algorithm of the terminal device 30 so as to be matched with the updated encryption algorithm.

[Updating Decryption Algorithm]

The server device 20 manages versions of the decryption algorithm stored in the terminal device 30 in database for each ID (IP address, for example) of the corresponding terminal device. When the encryption algorithm of the image related information is updated in the server device 20, Ids of all terminal devices are flagged, and a decryption algorithm corresponding to a new encryption algorithm is sent for update to the flagged one corresponding to the IDs of the corresponding terminal devices among terminal devices accessing to the server device 20 after that. Then, the flags corresponding to the Ids of the terminal devices having been updated are cleared. The decryption algorithm is stored in the HDD 23 of the server device.

The image data processing 304 includes a function for attempting decryption of image related information included in a corresponding information image file when the information image file is supplied and for checking whether or not a data structure of the decrypted image related information is normal. Then, if the decrypted data structure is not normal, it is inhibited to supply the corresponding information image file. It can prevent from supplying an illegally modified information image file. Further, an illegal information image file may be determined based on identification information added to the image data.

[Billing Processing]

Next, a billing method will be described where an information image file is supplied from a browser to the image data processing 304. When an information image file is supplied from a browser to the image data file, the image data processing 304 accesses to the server device 20 and requests for billing processing in order to perform billing.

An access log (creation log) described in the embodiment of the present invention is created under the condition that an information image file has been supplied from a browser to the image data processing 304 in the terminal device 30. That is, when an information image file is supplied to the image data processing, the MPU 31 extracts identification information embedded in the information image file from the supplied information image file, and send the identification information and a file name of the information image file to the server device 20. The server device 20 associates the received identification information and image file name, an IP address and a host name of an accessing terminal, and access date and time in order to create the above-described creation log (FIG. 3). Thus, a fact that an information image file is supplied to image data processing in the terminal device 30 is recorded in the access log of the server device 20.

[Billing Processing (1)]

A first billing method is a method whereby billing is performed on only a first supply of a same information image file by a same terminal (or it may be image data processing 304 having a same user or a same ID) while billing is not performed on second and later supplies. When an information image file is supplied to the image data processing 304, the MPU 31 of the terminal device sends to the server device 20 inherent identification information given to the information image file and a file name of the information image file and suggests billing to the server device 30. The MPU 21 of the server suggested for billing compares the IP address and the host name of the accessing terminal at that time, and received identification information and image file name with the creation log in order to determine whether or not a same information image file was supplied to the image data processing 304 in a same terminal in the past. As a result, if the same image file was supplied, billing is not performed on the supply at that time. On the other hand, if the same information image file was not supplied to the image data processing 304 in the same terminal, it is billed as a new supply.

[Billing Processing (2)]

A second billing method is a method according to the first billing method for billing newly when a supply is performed at a different date even if it is a supply of the same information image file in the same terminal. As a usage of the information image file, a usage may be considered whereby a free content service can be received before an expiration date. If a same information image file can be supplied in a same terminal repetitively without billing in this case, the expiration date of the free content service becomes meaningless. Thus, even if a same information image file is supplied in a same terminal, billing is performed when the supply is performed on a different date.

When the information image file is supplied to the image data processing 304, the MPU 31 of the terminal device sends, to the server device 20, inherent identification information given to the information image file and a file name of the information image file and further suggests billing to the server device 30. The MPU 21 of the server device suggested for bulling compares an IP address and a host name of a terminal accessing at that time and received identification information and image file name with the creation log in order to determine whether or not exactly same data has been registered on a same date. As a result, if it has registered on the same date, no billing is performed. On the other hand, if the same data has not been registered on the same date, billing is performed on supply of the information image file at that time.

[Billing Method (3)]

In the first and the second billing methods, not a same terminal but a same user may be used for determination. In this case, a user authorization system (function) is provided inside or outside of the server device 20, and when the access from the terminal device 30 to the server device 20 is requested, the user authorization system asks a user to authorize it in order to permit the access to the server device 30 when the user authorization is properly performed. According to this, since a user can be identified, it can be determined whether or not a same information image file was supplied to the image data processing 304 for each user in the past.

Here, a form for embedding image related information in an information image file (icon) may be a package in an icon form as described above or may be a package using Java (trademark) applet, ActiveX (trademark) control, or the like. The Java applet and the ActiveX control are both program units which can be executed by browser software such as Netscape (trademark) and Internet Explore (trademark). Then, the execution code is described by Java medium code for the Java applet, and by the CPU native code for the ActiveX control and can be started for execution by browsers, respectively. Further, both Java applet and ActiveX control can be graphically displayed on display screens of the browsers. When the Java applet or the ActiveX control, for example, is used, an applet only for displaying an image is prepared instead of an icon in which related information is embedded. Furthermore, when an (IMG) tag is used to display the icon on the browser, the applet may be executed by using (EMBED) or (APPLET) tag. Also, embedding related information for both of them is enough when it is executed in a program form.

INDUSTRIAL APPLICABILITY

According to the present invention, an image file is used in order to control each of terminal devices by embedding a pointer of information in the image file and controlling operations depending on a program corresponding to the pointer in the image file. Thus, various controls for the terminal devices can be defined at a supplier side of the image file.

Further, when an image of the image file is an image showing an operation of a program, for example, so that contents of the operation can be realized easily by referring to the image.

Since an information image file and image related information are separated, an effect for suppressing illegal use of an image file for unintended applications can be expected, and further a high return effect (access) to information of an image supplier from its distributed destination even if the image file is distributed in the same manner as the conventional manner.

Further, in the present invention, when inherent identification information is created depending on an access from a terminal and the created identification information is added to predetermined image data provided by an information supply server so as to record a correspondence relationship between identification information and image data to which the identification information is added, information regarding user accesses corresponding to the identification information added to the image data, an address of a terminal used by a user, for example, access time, and so on can be obtained by referring to the correspondence relationship. Therefore, researches of access conditions, for example, from a terminal can be performed relatively easily.

The invention claimed is:

1. A system for building an image file, comprising:
   means for receiving a displayable image and related data related to said displayable image;
   means for recording said displayable image into said image file;
   means for embedding unique identification information which uniquely identifies said image file into a non-displayable portion of said image file;
   means for preventing unauthorized redirecting from said displayable image by embedding said related data into said image file, which already includes said displayable image,
   wherein said related data includes pointers to at least one item of information enabling redirection from said displayable image to a site having said at least one item of information; and
   wherein said unique identification information is added so as to identify access to the image file when a user accesses the image file.

2. The system according to claim 1, further including information processing means for reading out said image file in response to a request and displaying said image file on a display device.

3. A system for building an image file, comprising:
   a file generator configured to generate said image file including a first area and a second area, said file generator including:
   a first area recorder configured to record first data used to display a displayable image onto said first area; and
   a second area recorder configured to record second data related to but not used to display the displayable image onto said second area, said second area recorder operating to record said second data to prevent unauthorized redirecting from said displayable image,
   wherein said second data includes pointers to at least one item of information enabling redirection from displayable image to a site including said at least one item of information,
   wherein said second data includes unique identification information which uniquely identifies said image file, and
   wherein said unique identification information is recorded so as to identify access to the image file when a user accesses the image file.

4. The system according to claim 3, further including information processing means for reading out said image file in response to a request and displaying said image file on a display device.

5. A system for generating an image file, comprising:
an image recorder configured to record a displayable image in said image file;
a data embedding apparatus configured to prevent unauthorized redirecting from said displayable image by embedding related data related to said displayable image in an area of said image file that is ignored when data from the image file is used to display the displayable image,
wherein said related data includes pointers to at least one item of information enabling redirection from said displayable image to a site including said at least one item of information,
wherein said related data includes unique identification information which uniquely identifies said image file; and
wherein said unique identification information is embedded so as to identify access to the image file when a user accesses the image file.

6. The system according to claim 5, further including
information processing means for reading out said image file in response to a request and displaying said image file on a display device.

7. A system for recording an image file, comprising:
means for storing a displayable image into said image file;
means for embedding unique identification information which uniquely identifies said image file into a non-displayable portion of said image file;
means for embedding a pointer to information used to display said displayable image and an instruction for handling the information, said pointer and said instruction configured to be dealt as one pair so that at least one pair of said pointer and said instruction is recorded,
wherein said pointer and instruction are embedded in an area of the image file that is not used for displaying said displayable image,
wherein said means for embedding prevents unauthorized redirecting from the displayable image; and
wherein said unique identification information is embedded so as to identify access to the image file when a user accesses the image file.

8. The system according to claim 1, 3, 5, or 7, wherein said related data, said second data, or said instruction further comprising:
an index for a menu item corresponding to the image file.

9. The system according to claim 1, 3, 5 or 7, further comprising an information processing means for reading out said image file in response to a request from a terminal device and returning it to said terminal device.

10. The system according to claim 7, further including
information processing means for reading out said image file in response to a request and displaying said image file on a display device.

11. A method for building an image file, the method comprising:
receiving a displayable image and related data related to said displayable image;
recording said displayable image into said image file;
embedding unique identification information which uniquely identifies said image file into a non-displayable portion of said image file;
preventing unauthorized redirecting from said displayable image by embedding said related data into said image file, which already includes said displayable image,
wherein said related data includes pointers to at least one item of information enabling redirection from said displayable image to a site having said at least one item of information; and
wherein said unique identification information is embedded so as to identify access to the image file when a user accesses the image file.

12. A computer-readable medium encoded with a computer program comprising executable instructions that cause a computer to execute the steps of:
monitoring an access to an information image file managed in a first managing area of the informational image file;
displaying an image based on image related information included in the information image file on a second managing area, and managing the information image file on the second managing area, when the information image file managed in the first managing area is accessed;
monitoring an access to an information image file managed in the second managing area of the informational image file;
accessing and executing a file pointed to by a predetermined pointer or a corresponding file stored in advance on a local recording medium, when the information image file managed in the second managing area is accessed;
preventing unauthorized redirecting from the image by including the image on the first managing area and the image related information on the second managing area in the same information image file,
wherein the image related information included in the information image file on the second managing area includes unique identification information which uniquely identifies said information image file; and
wherein said unique identification information is included so as to identify access to the image file when a user accesses the image file.

13. The medium on which an image file processing program according to claim 12 is recorded wherein an access to an information image file managed in said first managing area is a drag-and-drop operation for a corresponding image.

14. The medium on which an image file processing program according to claim 12 is recorded wherein an access to an information image file managed in said first managing area is a selection operation for a menu displayed with respect to a corresponding image.

15. The medium on which an image file processing program according to claim 12 is recorded wherein an access to an information image file managed in said first managing area is a drag-and-drop operation for a menu displayed with respect to a corresponding information image file.

16. The medium on which an image file processing program according to claim 12 is recorded wherein an access to an information image file managed in said first managing area is a click operation for a corresponding image.

17. The medium on which an image file processing program according to claim 12 is recorded wherein an access to an information image file managed in said first managing area is a drag-and-drop operation for a corresponding information image file.

18. The medium on which an image file processing program according to claim 12 is recorded, wherein said first managing area is a window for viewing a Web page of a WWW browser, a window for viewing a body of e-mail software, a window for checking an attached file of e-mail software, a folder window for referring a file stored on a recording medium, or a window which is displayed by operating input means for an image or an image file.

19. The medium for recording an image file processing program according to claim 12 wherein said first managing area and said second managing area are formed and managed by independent programs.

20. The medium for recording an image file processing program according to claim 19 wherein view selection tabs for selecting one of views of a first managing area and a view of a second managing area may be displayed in order to display selectively the managing area at a side of a tab selected through input means.

21. The medium for recording an image file processing program according to claim 19 wherein a view of the first managing area and a view of the second managing area are displayed simultaneously with a frame.

22. The computer readable medium for recording an image file processing program according to claim 12, wherein, when an access is made to an information image file managed in a first markup description language file which is a first managing area, a second markup description language file which is a second managing area is read out from memory means, and, after the second markup description language file is updated so that said second markup description language file manages said information image file, the second markup description language file is executed.

* * * * *